United States Patent [19]

DeMarco

[11] Patent Number: 5,025,621
[45] Date of Patent: Jun. 25, 1991

[54] COMBINATION GARDEN IMPLEMENT

[76] Inventor: Vito A. DeMarco, P.O. Box 1091, Dennis, Mass. 02638

[21] Appl. No.: 495,456

[22] Filed: Mar. 16, 1990

[51] Int. Cl.$^5$ .............................................. A01D 7/06
[52] U.S. Cl. ................................ 56/400.05; 56/400.07
[58] Field of Search .......... 56/400.04, 400.05, 400.06, 56/400.07, 400.17; D8/6

[56] References Cited

U.S. PATENT DOCUMENTS

| | | | |
|---|---|---|---|
| 2,726,504 | 12/1955 | Paluska | 56/400.05 |
| 2,795,923 | 6/1957 | Kapuczin | 56/400.05 |
| 3,402,543 | 9/1968 | Staggers | 56/400.05 |
| 3,930,544 | 1/1976 | Foster, Sr. | 56/400.07 X |

FOREIGN PATENT DOCUMENTS 637106 2/1962 Canada .............................. 56/400.05

Primary Examiner—Thuy M. Bui
Attorney, Agent, or Firm—Thomas A. Kahrl

[57] ABSTRACT

A combination garden cultivating and pruning device for manual operation having a metal head of generally rectangular shape comprising four cultivating implements, a pruning device and a handle of sufficient length to use while standing up having a cavity in the distal end for receiving the pruning device. The four cultivating implements included in the metal head disposed on four sides thereof include a rake positioned opposite from a sifter and a hoe positioned opposite a cultivator. The pruning devices includes shears, a round handle with a threaded portion, and a fin handle which fits in a slot provided in the round handle to permit closing of the shears are closed adapted to be threadably inserted in the cavity provided in the handle, and to be screwed in for a tight fit, with the outer surface providing a smooth rounded extension of the handle. This device comprises five tools-in-one providing increased convenience when in use in the garden and requiring far less storage space than is required for five separate tools when not in service.

5 Claims, 1 Drawing Sheet

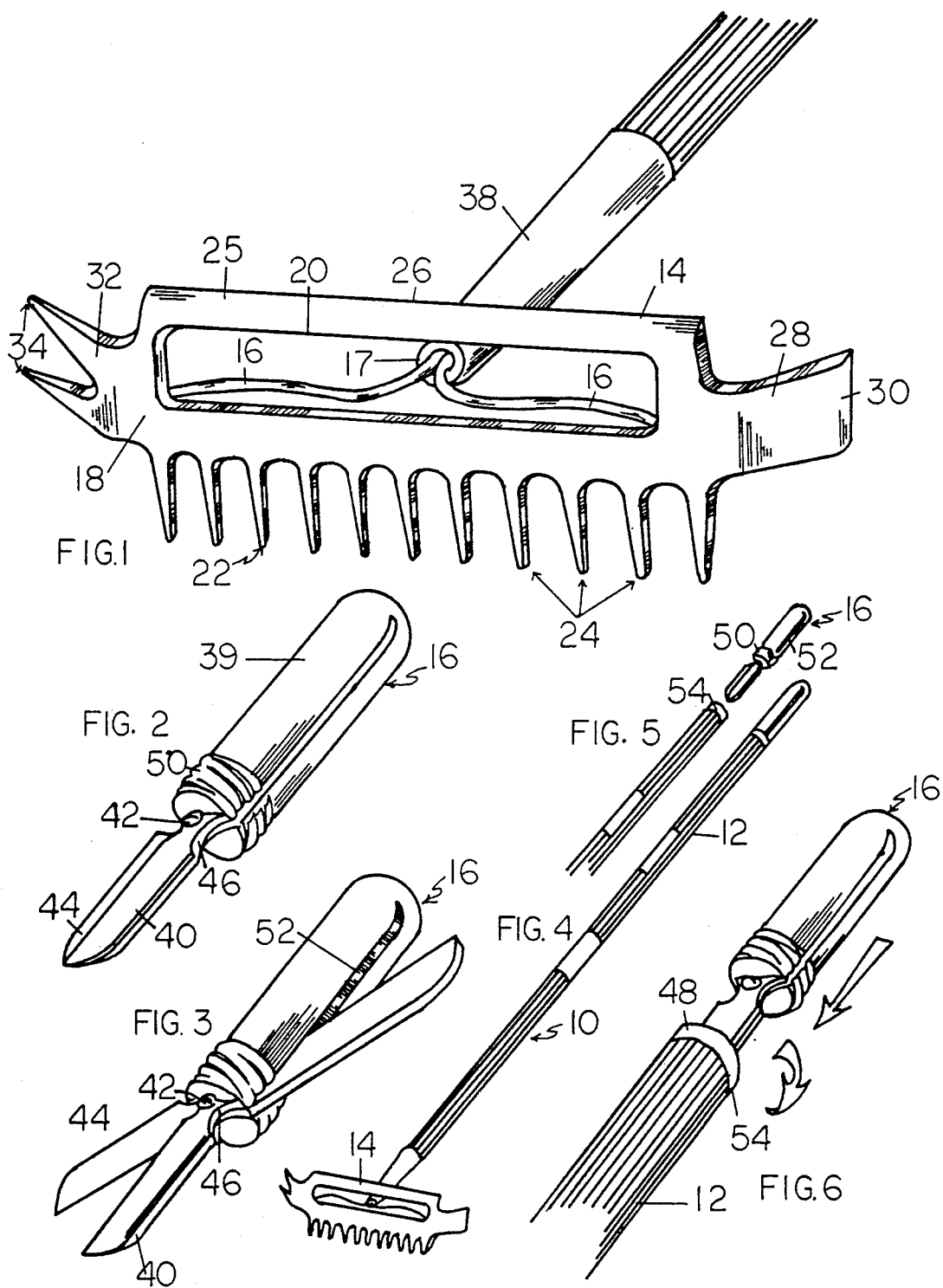

COMBINATION GARDEN IMPLEMENT

BACKGROUND OF THE INVENTION

Due to time and space limitations in modern households, there exists a need for a combination garden implement.

Prior art combination tools as disclosed in U.S. Pat. Nos. 816,320, 1,192,097, 2,317,916, 2,795,923, 3,930,544 and U.S. Pat. Nos. 133,489, 150,067, 212,198 and 230,247 provide for multiple implement tools, however, such tools have fewer implements and lack tempered metal for retaining sharpness of cutting surfaces. Gardening by its varied nature in the changing seasons requires a variety of tools for ground preparation, weeding, planting, hoeing, cultivation, removal of debris and cultivating. In modern homes garden tools no longer are kept in tool sheds, rather they are more likely to be stored in the garage. It is desirable to provide for neat orderly storage of tools. A large number of garden single purpose garden tools having a multiplicity of sharp points of cutting edges, when stored in a garage is likely to cause damage to items garaged therein such as automobiles, if the tools are improperly stored and or placed against other articles such as a car. Accordingly, a combination garden tool including five tools in one is preferred for its multi purpose utility as well as for its sightly appearance as it occupies a place in what many strive to keep neat and clean, the garage.

Often combination garden tools have been provided from metal stampings which are lightweight, quick to rust and relatively inexpensive but bend or break easily and lacking tempered steel are easy to dull and thereby make cultivating harder.

In the usual small compact garden and lawn where multiple tasks are to be performed, each task is of relatively short duration. Accordingly a quality garden implement having strong tool heads, sharp tool faces a secure mounting of the handle and pruning shears, make gardening work easier and less time consuming.

The enjoyment of performing the tasks is greatly enhanced by minimizing the time required to collect and bring to a work site the proper tools.

It is therefore desirable to provide for a convenient multi-tool garden implement.

A further object is to provide a sturdy garden implement having tempered working edges.

A still further object is to provide a garden implement adapted to be easily stored in a compact area.

Another object of the invention is to provide a multipurpose garden implement including four cultivating tools and a pair of pruning shears.

It is also a further object to provide for a readily removable pair of garden shears.

Another object is to provide a sightly tool which when cleaned can be hung for storage on the wall of a garage.

SUMMARY OF THE INVENTION

The present invention is directed to an improved combination garden apparatus having a multi-tooled head on a common handle.

Briefly, the present invention comprises an improved garden implement which includes a handle having a one end and another end, a fixed implement head including multiple garden tools and a removable pair of pruning shears mounted in the other end of the handle.

The garden implement apparatus includes the implement head comprising a hoe member, a rake member and a sifter member and a cultivator head for turning over soil and weeding of a garden.

The garden implement apparatus includes a pair of pruning shears in addition to the fixed implement head thus including in aggregate five gardening tools, to provide the operator with an entire array of implements for performing garden tasks.

The handle of the garden implement is constructed of wood, has a smooth finish for prevention of premature blistering of the users hands, an aperture at one end for receiving the pruning shears for storage and ready access; and optionally may include a brass name plate affixed in the mid section and includes a yoke for secure attachment of the implement head to the handle. The implement head includes four garden tools one on each side of the implement head.

The implement head of the invention may be constructed of heavy gauge metal typically of stainless steel construction to be rust resistant with the hoe member, the yoke member, the cultivator member and the sifter member being provided with forged working edges.

The invention will be described for the purposes of illustration only in connection with certain embodiments; however, it is recognized that those persons skilled in the art may make various changes, modifications, improvements and additions on the illustrated embodiments all without departing from the spirit and scope of the invention.

BRIEF DESCRIPTION OF THE DRAWINGS

FIG. 1 is a perspective view from above of the combination garden apparatus of the invention showing one implement element;

FIG. 2 is a perspective view of the pruning shears shown in the closed position, of the invention detached from the garden apparatus of the invention;

FIG. 3 is a perspective view of the pruning shears of the invention shown in the open position;

FIG. 4 is a perspective view from above of the combination garden implement;

FIG. 5 is a fragmentary perspective view of the handle of the invention with the pruning shears in the detached and closed position; and FIG. 6 is a fragmentary exploded view of the pruning shears being unthreaded from the handle.

DESCRIPTION OF THE EMBODIMENTS

With reference to the drawings there is shown a combined garden implement 10 for cultivating soil, having a handle 12 having a one end and another end with a implement head 14 securely attached to the one end and a pruning apparatus 16 threadedly connected to the other end for easy removal; the implement head 14 being attached in perpendicular relation to handle 12 by a yoke 17.

The implement head 14 constructed of heavy gauge metal, preferably forged cast, formed in an elongated generally rectangular base element including an elongated slot 20, for permitting sifting of soil being worked, mid base element having a first longitudinal side and a second longitudinal side and a one end and an other end comprises a rake 22 having a plurality of fixed, spaced-apart teeth elements 24 extending along the first longitudinal side of the implement head 14, a sifter 25 member characterized by an elongated blade 26 extending along the second longitudinal side of the implement head 14, a hoe member 28 characterized by a single hoe blade 30 positioned on the one end of the implement head 14 extending outwardly in a generally perpendicular relationship to both the rake 22 and sifter 25, and a cultivator fork 32 characterized by a pair of spaced tines 34 having sharp tips extending outwardly in a generally perpendicular relationship to both the rake 22 and sifter 25.

The yoke 17 has a plurality of arms each having a handle end and a implement head end 16 firmly secured by a metallic collar 38 to the implement end of the handle. The arms being firmly secured to the collar 38 extend outwardly and away from the collar 38 to the outer portion of the implement head adjacent the cultivator fork 32 and hoe 28.

As shown in FIG. 2 the pruning shears apparatus 16 comprises a threaded section 50, a longitudinal slot 52, a pruning handle 39 constructed with a smooth and rounded exterior securely attached to a fixed shear blade 40, having a blade side and a back side, adapted to receive pivot screw 42 for pivotal attachment for movement between an open position and a closed cutting position with a movable blade 44 which also has a cutting side of the blade and a back side, wherein a notch 46 is provided in the back side of the fixed and movable blades.

As further showing in FIG. 6, the pruning apparatus 16 when in the closed position is adapted to be received by a cavity 48 provided in the end of the handle 12 and of the handle by inserting the fixed blade 40 and movable blade 44 in closed relationship into the cavity 48. The male threaded section 50 engages a female threaded section 52 formed in the inner circumference of ring 54. To mount the pruning apparatus 16 on the handle, the closed blades 40 and 44 can be thrust straight into the cavity 48 and threaded by female thrusts turned such that the male thread section 50 engages the inner portion of ring 52. In operation the present invention is manually operated by the user to provide the multiple cultivating operations of hoeing, raking, sifting, cultivating and upon removal of the pruning shears, pruning.

What is claimed is:

1. An improved combination garden implement apparatus comprising,
   (a) a handle of substantial length having a one end and an other end;
   (b) an implement head means of generally rectangular construction having a first and second longitudinal side, and a first and second end for mounting multipurpose garden tool means attached to the one end of the handle mounted in perpendicular relationship with the handle;
   (c) the multi-purpose gardening tool means for performing multiple garden tasks comprising;
      (i) a rake member extending along the first longitudinal side;
      (ii) a sifter member extending along the second longitudinal side of the implement head means;
      (iii) a hoe member extending outwardly from the one end of the implement head;
      (iv) a cultivator extending outwardly from the other end of the implement head means;
   (d) pruning means mounted on the other end of the handle for detachment to use for pruning, the pruning means comprising;
      (i) a handle element comprising a threaded sector in a longitudinal slot;
      (ii) a shear blade fixedly fastened to the handle extendingly outward having a cultivating top;
      (iii) a movable scissors blade having a blade end and a handle end.

2. The garden implement apparatus of claim 1 wherein an implement head is mounted on the one end of the handle in perpendicular relationship therewith on a yoke means comprising a plurality of curved outwardly extending arms having a base section rigidly secured to the one end of the handle by collar means of tubular construction which is compressively attached to the handle to hold the implement head in fixed perpendicular relationship thereto and the other end is provided with a cavity for receiving a pair of the pruning shears.

3. The garden implement apparatus of claim 1 wherein the handle is provided with a cavity at the other end for receiving a pair of pruning shears.

4. An improved combination garden implement apparatus comprising:
   (a) an implement head means of generally rectangular construction, for mounting a garden tool means;
   (b) gardening tool means for providing multiple garden tool elements each having different and distinct advantages and using comprising;
      (i) a rake member extending along the first longitudinal side which rake member has a plurality of fixed, spaced apart teeth elements;
      (ii) a sifter member extending along the second longitudinal sides of the implement head means characterized by an elongated blade disposed on the opposite side of the head;
      (iii) a hoe member extending from the one end of the implement head characterized by a single hoe blade extending in perpendicular relation to the handle;
      (iv) a cultivator extending from the other end of the implement head characterized by spaced pointed forks;
      (v) a yoke fastened to the implement head means securely fastened by sleeve fastener means to the handle at the cultivator end;
   (c) pruning means for being threadily connected at the other end of the handle for movement between a mounted stored position and a detached position for remote operation by a user for pruning.

5. The improved combination garden implement wherein the pruning means comprises;
   (a) a handle element having a threaded sector and an longitudinal slot;
   (b) a shear blade fixedly fastened to the handle extending outwardly having a cultivating top;
   (c) a movable scissors blade having a blade end and a handle end, movably attached to the fixed blade by hinge means adapted to permit the movable blade to be closed against the fixed blade to provide cutting action.

* * * * *